United States Patent
Quillinan et al.

[15] 3,699,341
[45] Oct. 17, 1972

[54] MUZZLE FLASH DETECTOR

[72] Inventors: John H. Quillinan, Ambler; Edward F. Mackey, West Chester, both of Pa.

[73] Assignee: General Electric Company

[22] Filed: Sept. 23, 1968

[21] Appl. No.: 761,624

[52] U.S. Cl..............250/83.3 H, 356/141, 356/152
[51] Int. Cl.................................G01t 1/16
[58] Field of Search...........356/141, 152; 250/83.3 H

[56] References Cited

UNITED STATES PATENTS

| | | |
|---|---|---|
| 2,800,831 | 7/1957 | Keiser et al..............356/141 |
| 3,147,384 | 9/1964 | Fenton et al..........250/83.3 X |

Primary Examiner—Richard A. Farley
Attorney—William G. Becker, Paul F. Prestia, Allen E. Amgott, Henry W. Kaufmann, Frank L. Neuhauser, Oscar B. Waddell and Melvin M. Goldenberg

[57] ABSTRACT

An optical sight with muzzle flash detector for providing a visual indication on the sight image of a muzzle flash of a firearm by passive detection of the IR radiation coming from the flash. A filter separates infrared radiation from the visual light coming through the sight and aims it at a fixed matrix of PbS detectors. The resulting signal activates a corresponding lamp or lamps in a lamp matrix similar to that of the detectors to form a visible light image passing through the sight so as to give an indication of the location of a firearm's muzzle flash.

13 Claims, 2 Drawing Figures

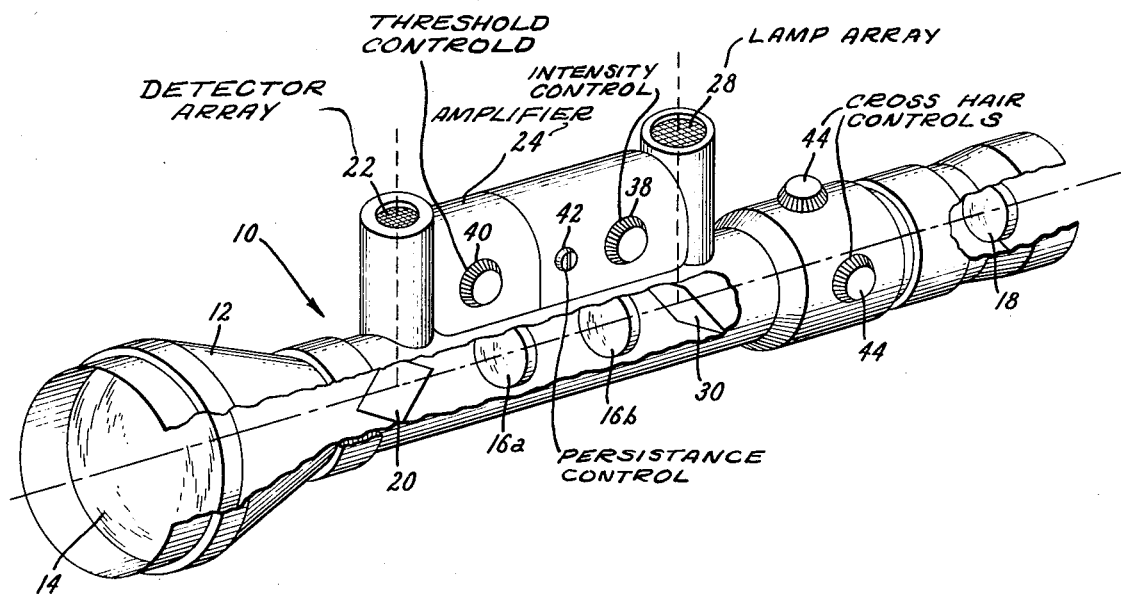
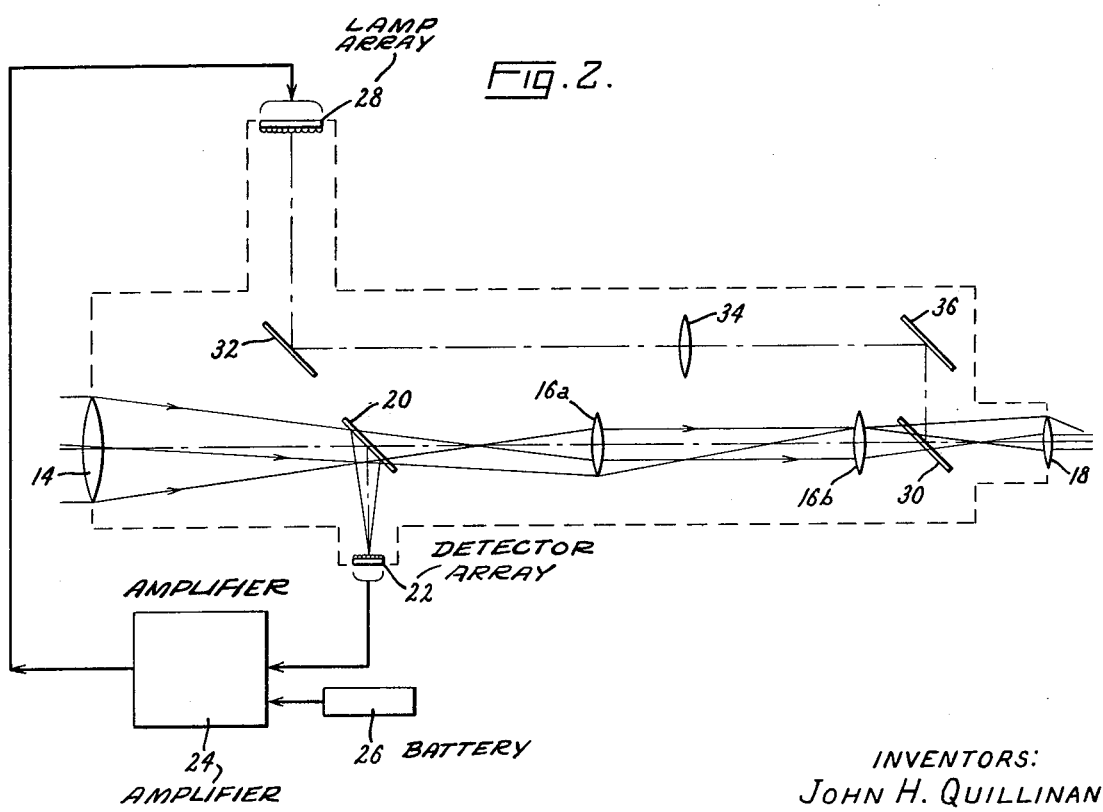

MUZZLE FLASH DETECTOR

BACKGROUND OF THE INVENTION

The subject invention generally relates to the field of infrared (IR) radiation detectors and, in particular, to the use of such a detector in combination with an optical sight.

It is highly advantageous but very difficult to accurately locate hostile troops or persons firing on friendly forces by sniping or from ambushes particularly in the daytime when muzzle flashes cannot usually be detected by the unaided human eye. While there are many possible methods of hostile troop detection such as by radar, acoustics or IR detection, it has been found that IR passive detection of muzzle flash is the most promising as the IR radiation of a muzzle flash cannot be readily concealed and can be detected at more than sufficient range with highly accurate resolution.

While in the past an IR detector has been combined with a telescope, such combination did not provide a reliable indication of muzzle flash primarily because a moving scanner, which necessarily only viewed a portion of the scene, was used. Other problems included in prior art devices were that an absolute position of the muzzle flash was usually not indicated, but rather the prior art devices provided only an indication whether the telescopic sight was on target or in which direction it should be moved to place it on target; parrallax errors could occur because the IR sensor did not see the radiation from the same scene viewed through the telescopic sight; and the use of moving parts made the combination extremely susceptible to shock and environmental conditions which would limit its usefulness in actual conditions.

SUMMARY OF THE INVENTION

Accordingly, it is the object of the subject invention to provide an IR muzzle flash detector using any optical sight which superimposes a simultaneous visible indication of the location of a muzzle flash on the sight image.

A further object of the subject invention is to provide an IR muzzle flash detector optical sight in which the detector at all times views the entire field seen through the sight.

Another object of the subject invention is to provide an IR muzzle flash detector optical sight which has no moving parts.

In order to fulfill the above objects, the subject invention provides a muzzle flash detector sight including a standard optical lens system. A dichroic filter located behind a first portion of the lens system reflects IR radiation toward a matrix of PbS detectors without appreciably impeding visible light rays. Signals from the PbS detector matrix are amplified and communicated to a matrix array of lamps to activate one or more lamps which correspond to the location of the signals in the detector matrix. The resultant visible light signal, which has a position corresponding to the location of the IR radiation entering the sight, is then superimposed on the visible light rays passing through the lens system by means of a beam splitter mirror. As seen through the lens system the sight image has a visible light signal located at a position on the visible light scene where a firearm's muzzle flash has occurred, substantially simultaneously therewith.

The subject matter which is regarded as the present invention is particularly pointed out and distinctly claimed in the concluding portion of the specification.

BRIEF DESCRIPTION OF THE DRAWINGS

The invention, together with further objects and advantages thereof, may best be understood with reference to the following description taken in connection with the accompanying drawing in which:

FIG. 1 is a perspective, partially cutaway view of a typical gunsight embodying the subject invention; and FIG. 2 is a side schematic view of a slightly different optical sight embodying the subject invention.

DESCRIPTION OF THE PREFERRED EMBODIMENTS

In FIG. 1 a partially cutaway, perspective view of a muzzle flash detector telescopic gunsight 10 embodying the subject invention is shown. Put in its most simplest terms, the gunsight 10 consists of a standard telescopic lens system with an integral muzzle flash detector which changes IR radiation coming through the lens system into a visible signal through the gunsight at the same location as the IR radiation and simultaneously therewith. This allows the human eye to detect the muzzle flash of firearms during daylight or at night.

The telescopic lens system typically is enclosed in a casing 12 and consists of an objective lens 14, two erecting system lenses 16a, 16b and an eyepiece lens 18.

The flash detector portion of the gunsight is comprised of a plurality of elements, as shown in FIG. 1 and FIG. 2 schematically, which change any IR radiation coming through the objective lens 14 to a visible light signal. IR radiation passing through the objective lens 14 is reflected out of the visible light path through the lens system by a dichroic filter 20. This reflected radiation is directed to form a real image on a fixed matrix array of PbS detectors 22. The PbS detectors 22, which are sensitive to IR radiation, are arranged in a suitable fixed array, for example a 12 by 12 array of 144 elements. IR radiation reaching one or more of these elements causes an electric signal to be generated which is amplified by means of an amplifier 24, which is powered by a battery 26. Then the amplified signal is communicated to a matrix array of lamps 28. Lamps in the array 28, which correspond in location to the detector elements 22 which have been activated by IR radiation, are thereby activated to produce a visible light signal corresponding in location to the IR radiation which had passed through the objective lens 14.

Then the visible light signal is directed, if necessary, by suitable means to a beam splitter 30 such as a half silvered mirror located between the second erecting lens 16b and the eyepiece lens 18. The visible light signal from the lamp array 28 may be properly aligned with the beam splitter 30 as shown in FIG. 1, or may be directed thereto via a system of mirrors and lenses as shown in FIG. 2. In the latter embodiment the light signal is reflected by a first mirror 32 through a lens 34 to a second mirror 36 which in turn directs the light signal to the beam splitter 30.

The beam splitter 30 is positioned at a substantial acute angle, such as the 45° angle to the straight line light path through the lens system shown in FIGS. 1 and 2, so that visible light coming from the erecting lenses 16a, 16b will pass directly therethrough and the visible light signal coming from the lamp array 28 will be reflected so as to be superimposed on the first mentioned visible light. After this, the combined visible light passes through the eyepiece lens 18 to the viewer.

In addition to the elements described above, the gunsight preferably includes a light intensity control 38 which controls the intensity of the visible light signal initiated in the lamp matrix 28 due to the detection of IR radiation. This control 38 acts directly on the lamp array 28. A threshold control 40 may be used to effect a form of control of the sensitivity of IR detection. A display persistence control 42 permits adjustment of persistence time of the superimposed lamp signal.

Also, the gunsight 10 preferably contains cross hair control knobs 44 which are generally found on standard telescopic sights.

The matrix array of PbS detectors 22 is fixed and is specifically designed so that IR radiation on any part of the field of the telescope will be detected instantaneously. By having a fixed array there is no chance that a muzzle flash will go undetected as could be the case with a scanning-type detector which is able to survey only one portion of the field of view at a time. This is a significant advantage particularly when the gunsight is to be used to detect small arms fire wherein the IR radiation lasts for only a very short period, in the order of milliseconds.

A one to one correspondence must exist between the detector matrix array 22 and the lamp matrix array 28. This does not mean that their physical sizes need be identical but rather that the number of elements and general arrangement of the elements in each array must be the same. Therefore, for a 12 by 12 array of 144 detector elements a lamp array of 12 by 12 with 144 lamp elements should be used. This correspondence is necessary so that the location of the IR radiation detected on one or more detectors will be accurately transposed to the corresponding lamp or lamps in the lamp array.

It should be understood that the amplifier 24, as recited above, may include a separate amplifier element for each element in the detector array 22 which is connected to the corresponding lamp element in the lamp array 28.

While the detector elements in the array 22 have been specifically described as being PbS, any detector material sensitive to IR radiation could be used. Also, rather than using a separate amplifier for each of the elements, as disclosed in the preferred embodiment, one common amplifier may be used in combination with a scanner which scans the elements in the detector array. However, such a scanner must be of sufficient speed to insure that the energization of any element by IR radiation does not go undetected.

If desired, the lamp matrix array could be substituted by an electroluminescent screen which could be activated by an electron beam controlled by the signal coming from the detector array or light emitting diodes which are triggered by the IR detector amplifier circuit.

The muzzle flash detecting system may be used with most standard optical lens systems which may give a magnified, wide angle or true size image. A sight incorporating the subject invention may be used as a gunsight attached to a rifle, separately as a spotter sight or in connection with other equipment.

Thus the subject invention provides a muzzle flash detector sight which provides a visible indication of a muzzle flash directly on the visual image seen through a sight. The use of a non-scanning, fixed matrix array of detectors assures that every muzzle flash will be detected. Because the IR radiation which is detected is derived from the primary light path through the lens system itself, no parallax error can occur between the visual light image and the superimposed visual light muzzle flash indicating signal. Also, since there are no moving parts, the device is easy to manufacture, highly reliable, and better able to withstand a wide variety of environmental conditions without degradation of performance.

It is fully intended that many modifications may be made to the disclosed device which do not depart from the scope of this invention. Accordingly, the scope of the above invention is to be construed only in regard to the appended claims.

What we claim as new and desire to secure by Letters Patent is:

1. A muzzle flash detector optical sight comprising:
   a. an optical lens system;
   b. dichroic filter means for reflecting IR radiation from light passing through a first portion of said lens system, said filter means being substantially transparent to visible light;
   c. fixed detector means which is sensitive to IR radiation and is positioned to receive IR radiation reflected from said filter means for detecting the location of IR radiation and producing a signal indicative thereof;
   d. light producing means for producing a visible light signal in response to the signal from said detector means; and
   e. means for superimposing said visible light signal on the visible light passing through a latter portion of said lens system.

2. A sight as in claim 1 wherein said detector means is comprised of an array of IR sensitive elements and means for amplifying a signal coming from each of said IR sensitive elements.

3. A sight as in claim 2 wherein said IR sensitive elements are PbS elements.

4. A sight as in claim 2 wherein said means for amplifying a signal is comprised of a separate amplifier for each of said IR sensitive elements.

5. A sight as in claim 1 wherein said means for superimposing includes a beam splitter positioned a substantial angle to the light path through said lens system to reflect the visible light signal from said light means so that it is superimposed upon the visible light passing through said lens system.

6. A sight as in claim 2 wherein said light producing means includes an array of electric lamps corresponding in number and arrangement to the array of said IR sensitive elements.

7. A sight as in claim 4 wherein said light producing means includes an array of electric lamps corresponding in number and arrangement to the array of said IR sensitive elements.

8. A sight as in claim 1 wherein control means are provided for controlling the intensity of the visible light signal.

9. A sight as in claim 1 including means for controlling the threshold sensitivity of said fixed detector means.

10. A sight as in claim 1 including means for controlling the persistence of said visible light signal.

11. A sight as in claim 1 wherein a system of at least one mirror and one lens are provided for transmitting said visible light signal from said light producing means to said means for superimposing.

12. A sight as in claim 6 wherein said lens system is comprised of an objective lens, two erecting lenses and an eyepiece lens, said filter means being located between said objective lens and the first of said erecting lenses.

13. A sight as in claim 12 wherein said means for superimposing includes a beam splitter located between the second of said erecting lenses and said eyepiece lens and positioned at a substantial angle to the light path through said lens system to reflect the visible light signal from said light means so that it is superimposed upon the visible light passing through said lens system.

* * * * *